(12) United States Patent
Karnalkar et al.

(10) Patent No.: US 9,084,101 B2
(45) Date of Patent: *Jul. 14, 2015

(54) METHOD AND APPARATUS FOR DISTRIBUTING ALERTS

(71) Applicant: AT&T Intellectual Property I, LP, Atlanta, GA (US)

(72) Inventors: Anup D Karnalkar, Allen, TX (US); R. Tyler Wallis, Dalls, TX (US); William Stanley Robbins, Sun Prairie, WI (US); Susan Steele, Phillipsburg, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 268 days.

This patent is subject to a terminal disclaimer.

(21) Appl. No.: 13/872,259

(22) Filed: Apr. 29, 2013

(65) Prior Publication Data

US 2013/0237178 A1 Sep. 12, 2013

Related U.S. Application Data

(63) Continuation of application No. 12/275,680, filed on Nov. 21, 2008, now Pat. No. 8,451,985.

(51) Int. Cl.
*H04W 4/22* (2009.01)
*H04M 3/533* (2006.01)
*H04M 3/02* (2006.01)
(Continued)

(52) U.S. Cl.
CPC ............. *H04W 4/22* (2013.01); *H04L 65/1096* (2013.01); *H04M 3/53375* (2013.01); *H04L 65/1016* (2013.01); *H04M 3/02* (2013.01); *H04M 3/4211* (2013.01); *H04M 2203/205* (2013.01); *H04M 2207/18* (2013.01)

(58) Field of Classification Search
CPC . H04M 3/02; H04M 3/4211; H04M 3/53375; H04M 2207/18; H04M 2203/205; H04L 65/1096; H04L 65/1016
USPC .............. 379/39, 40, 49, 88.16, 88.21, 88.22, 379/93.12, 200, 201.02; 455/404.1, 450, 455/456.3; 702/3; 709/200; 725/33, 108
See application file for complete search history.

(56) References Cited

U.S. PATENT DOCUMENTS 5,541,980 A * 7/1996 Urewicz ..................... 455/404.1
6,112,075 A * 8/2000 Weiser ........................ 455/404.1
6,522,886 B1 * 2/2003 Youngs et al. ................ 455/450
(Continued)

FOREIGN PATENT DOCUMENTS

WO 01/52512 7/2001

*Primary Examiner* — Gerald Gauthier
(74) *Attorney, Agent, or Firm* — Guntin & Gust, PLC; Ralph Trementozzi (57) ABSTRACT

A system that incorporates teachings of the present disclosure may include, for example, a cordless phone operating in an establishment with a plurality of cordless phone handsets having a controller adapted to monitor a source for weather alerts, detect a weather alert, determine from the weather alert a weather alert type, retrieve a user profile, identify from the user profile and the weather alert type one or more of the plurality of cordless phone handsets to be notified of the weather alert, select from the user profile a ringtone type for each of the identified cordless phone handsets, wherein the ringtone type identifies the weather alert type, and transmit a message to cause each of the indentified cordless phone handsets to assert the ringtone type identified therefor. Other embodiments are disclosed.

20 Claims, 6 Drawing Sheets

(51) Int. Cl.
    *H04M 3/42*        (2006.01)
    *H04L 29/06*       (2006.01)

(56)            References Cited

U.S. PATENT DOCUMENTS

| | | | |
|---|---|---|---|
| 6,724,861 B2 * | 4/2004 | Newland et al. | 379/49 |
| 6,816,878 B1 * | 11/2004 | Zimmers et al. | 709/200 |
| 6,920,204 B1 * | 7/2005 | Tuttle | 379/88.16 |
| 7,054,612 B2 | 5/2006 | Patel | |
| 7,139,664 B2 | 11/2006 | Kelly et al. | |
| 7,149,533 B2 * | 12/2006 | Laird et al. | 455/456.3 |
| 7,181,345 B2 * | 2/2007 | Rosenfeld et al. | 702/3 |
| 7,418,087 B2 * | 8/2008 | Luneau et al. | 379/88.21 |
| 7,609,819 B1 * | 10/2009 | Tuttle | 379/40 |
| 7,809,123 B2 * | 10/2010 | Karnalkar et al. | 379/200 |
| 8,238,869 B2 | 8/2012 | Brayton | |
| 8,340,265 B2 * | 12/2012 | Karnalkar et al. | 379/201.02 |
| 8,433,044 B2 * | 4/2013 | Karnalkar et al. | 379/88.22 |
| 8,451,985 B2 * | 5/2013 | Karnalkar et al. | 379/39 |
| 8,880,019 B1 * | 11/2014 | Daly et al. | 455/404.1 |
| 2003/0196200 A1 * | 10/2003 | Manson et al. | 725/33 |
| 2005/0239436 A1 | 10/2005 | Bell | |
| 2006/0015916 A1 * | 1/2006 | Yun | 725/108 |
| 2006/0040639 A1 * | 2/2006 | Karl et al. | 455/404.1 |
| 2006/0058005 A1 | 3/2006 | Dolezal | |
| 2006/0223492 A1 | 10/2006 | Chin | |
| 2007/0052533 A1 | 3/2007 | Glazer | |
| 2008/0214207 A1 | 9/2008 | Karabinis | |
| 2009/0180599 A1 * | 7/2009 | Jackowitz et al. | 379/93.12 |
| 2009/0196411 A1 | 8/2009 | Hawkins | |
| 2010/0128853 A1 * | 5/2010 | Karnalkar et al. | 379/39 |
| 2013/0237178 A1 * | 9/2013 | Karnalkar et al. | 455/404.1 |

* cited by examiner

FIG. 7

METHOD AND APPARATUS FOR DISTRIBUTING ALERTS

CROSS-REFERENCE TO RELATED APPLICATIONS

This application is a continuation of and claims priority to U.S. patent application Ser. No. 12/275,680 filed Nov. 21, 2008 which is incorporated herein by reference in its entirety.

FIELD OF THE DISCLOSURE

The present disclosure relates generally to communication techniques and more specifically to a method and apparatus for distributing alerts.

BACKGROUND

An emergency alert system (EAS) can generate alert messages such as severe weather warnings by way of radio and TV stations. EAS messages can save lives by providing individuals early warning to seek shelter in dangerous situations such as tornadoes. EAS messages can also be retrieved over the Internet.

DETAILED DESCRIPTION

One embodiment of the present disclosure can entail a device having a tablet with a touch-sensitive display for managing a user interface. A base unit can be communicatively coupled to the tablet by way of a cordless phone protocol and a wireless data protocol. The base unit can also be communicatively coupled to a plurality of handsets by way of the cordless phone protocol. The base unit can further be communicatively coupled to a voice communication system and a data communication system, which can provide voice and data communication services to the tablet, and voice communication services to the plurality of handsets. The tablet can be adapted to monitor a source for weather alerts, detect a weather alert, determine from the weather alert a weather alert type, retrieve a user profile, identify from the user profile and the weather alert type one or more of the plurality of handsets to be notified of the weather alert, identify from the user profile a ringtone type for each of the identified handsets, and cause by way of the base unit each of the indentified handsets to assert the ringtone type identified therefor.

Another embodiment of the present disclosure can entail a cordless phone operating in an establishment with a plurality of cordless phone handsets having a controller adapted to monitor a source for weather alerts, detect a weather alert, determine from the weather alert a weather alert type, retrieve a user profile, identify from the user profile and the weather alert type one or more of the plurality of cordless phone handsets to be notified of the weather alert, select from the user profile a ringtone type for each of the identified cordless phone handsets, wherein the ringtone type identifies the weather alert type, and transmit a message to cause each of the indentified cordless phone handsets to assert the ringtone type identified therefor.

Yet another embodiment of the present disclosure can entail a computer-readable storage medium operating in a cordless phone having computer instructions to detect a weather alert, determine from the weather alert a weather alert type, identify from a user profile and the weather alert type one or more companion cordless phone handsets to be notified of the weather alert, determine from the user profile a ringtone type for each of the identified cordless phone handsets, and transmit a message to cause each of the indentified cordless phone handsets to assert the ringtone type identified therefor.

Figure 1:
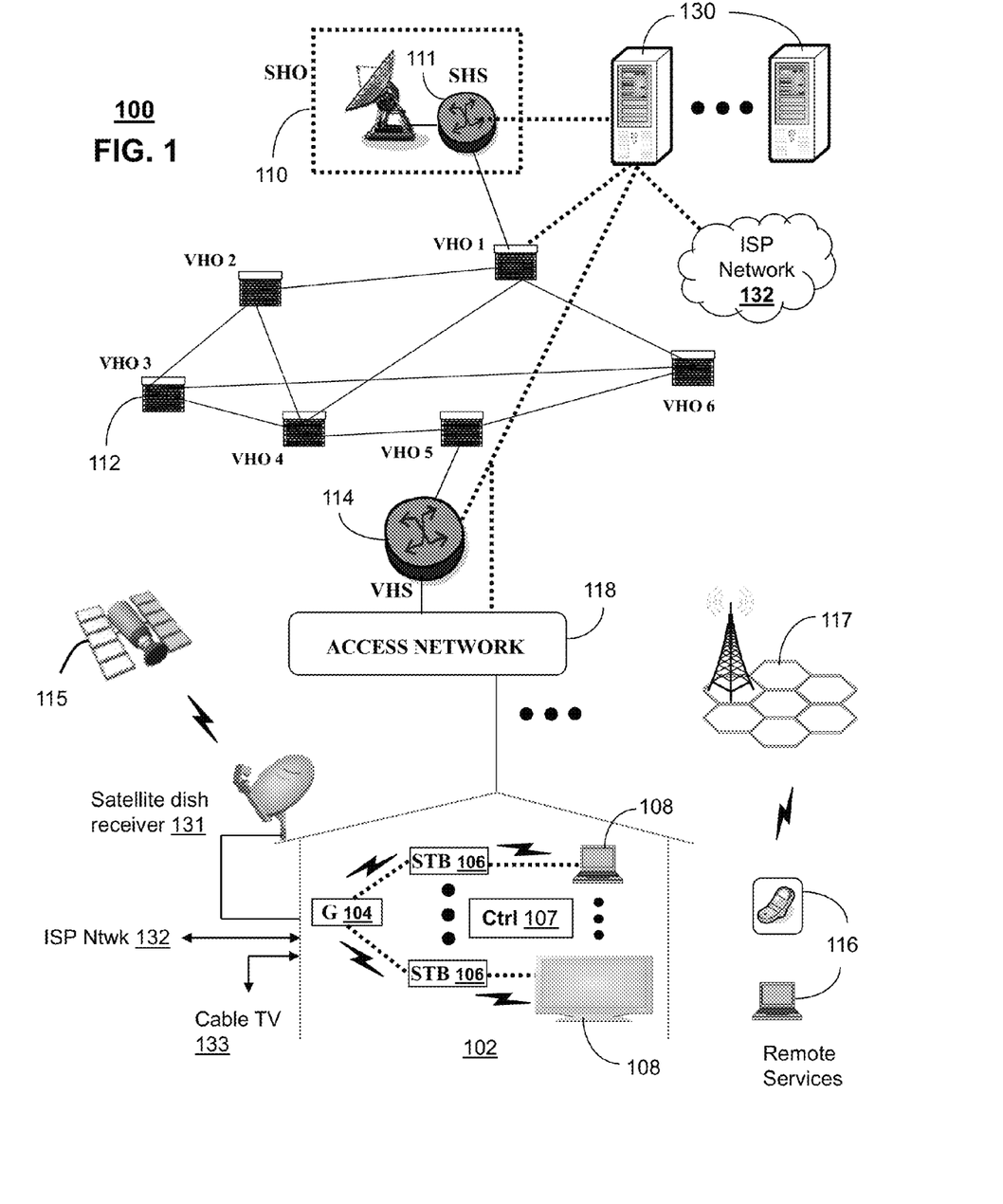
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 114 can represent a group of digital subscriber line access multiplexers (DSLAMs) located in a central office or a service area interface that provide broadband services over optical links or copper twisted pairs to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
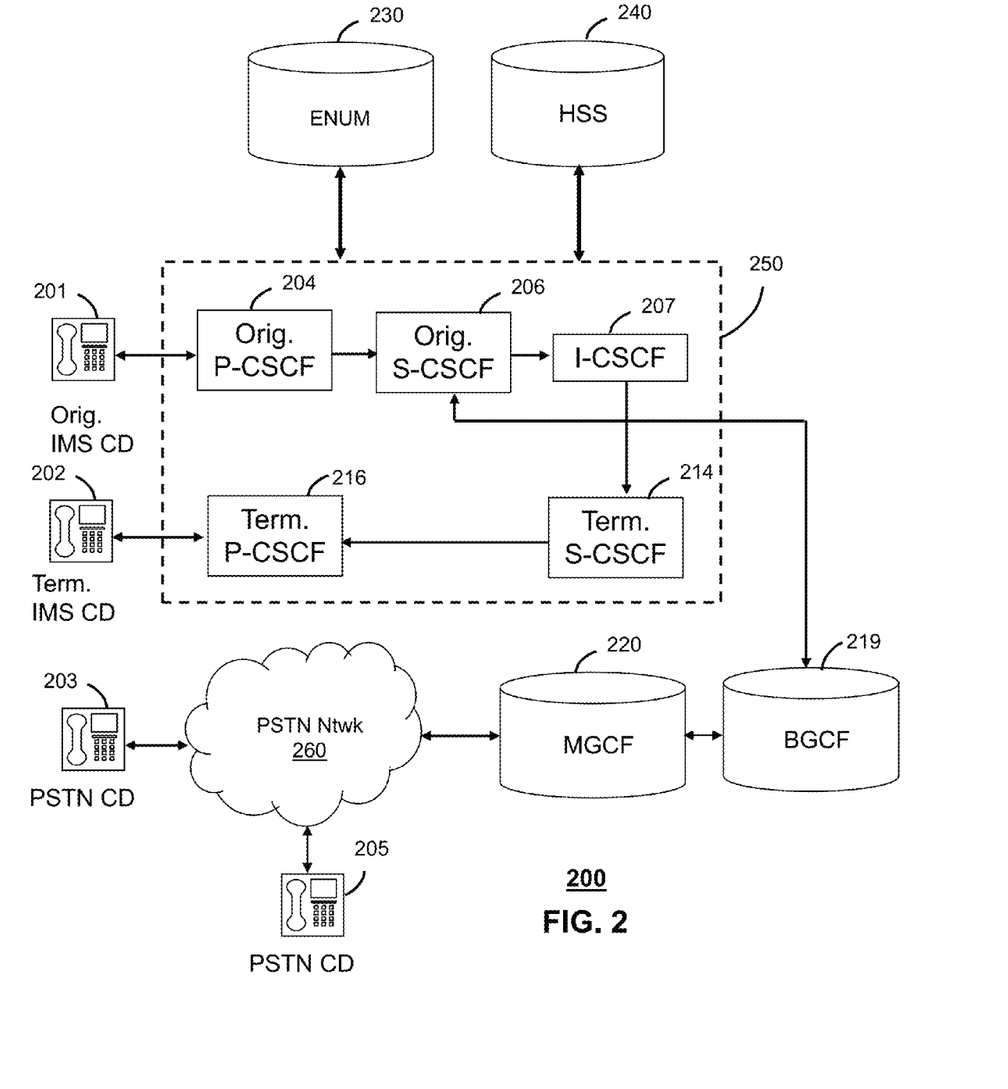

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
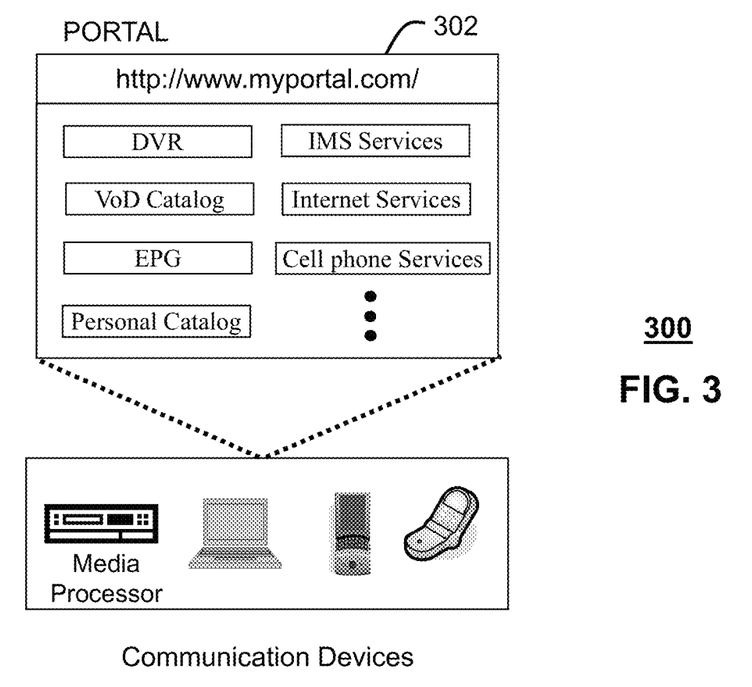
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
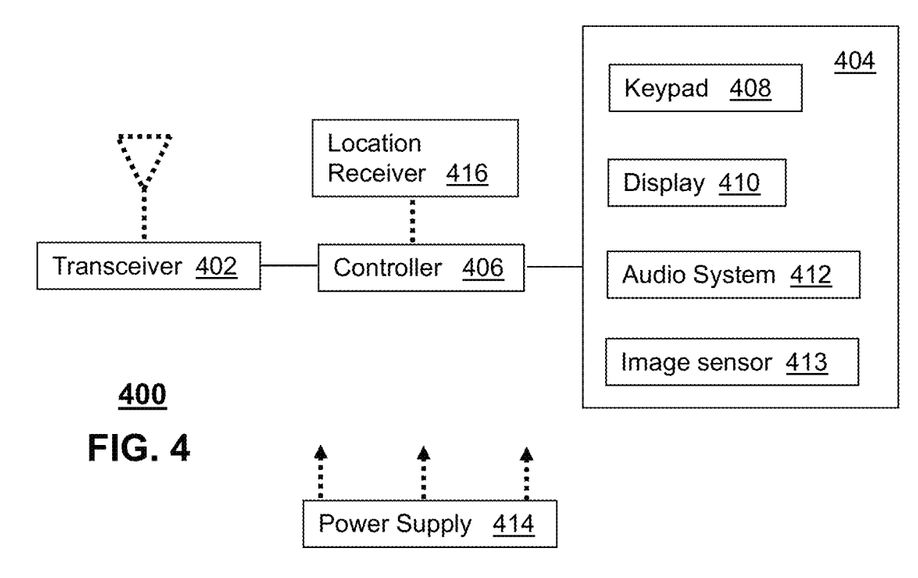
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
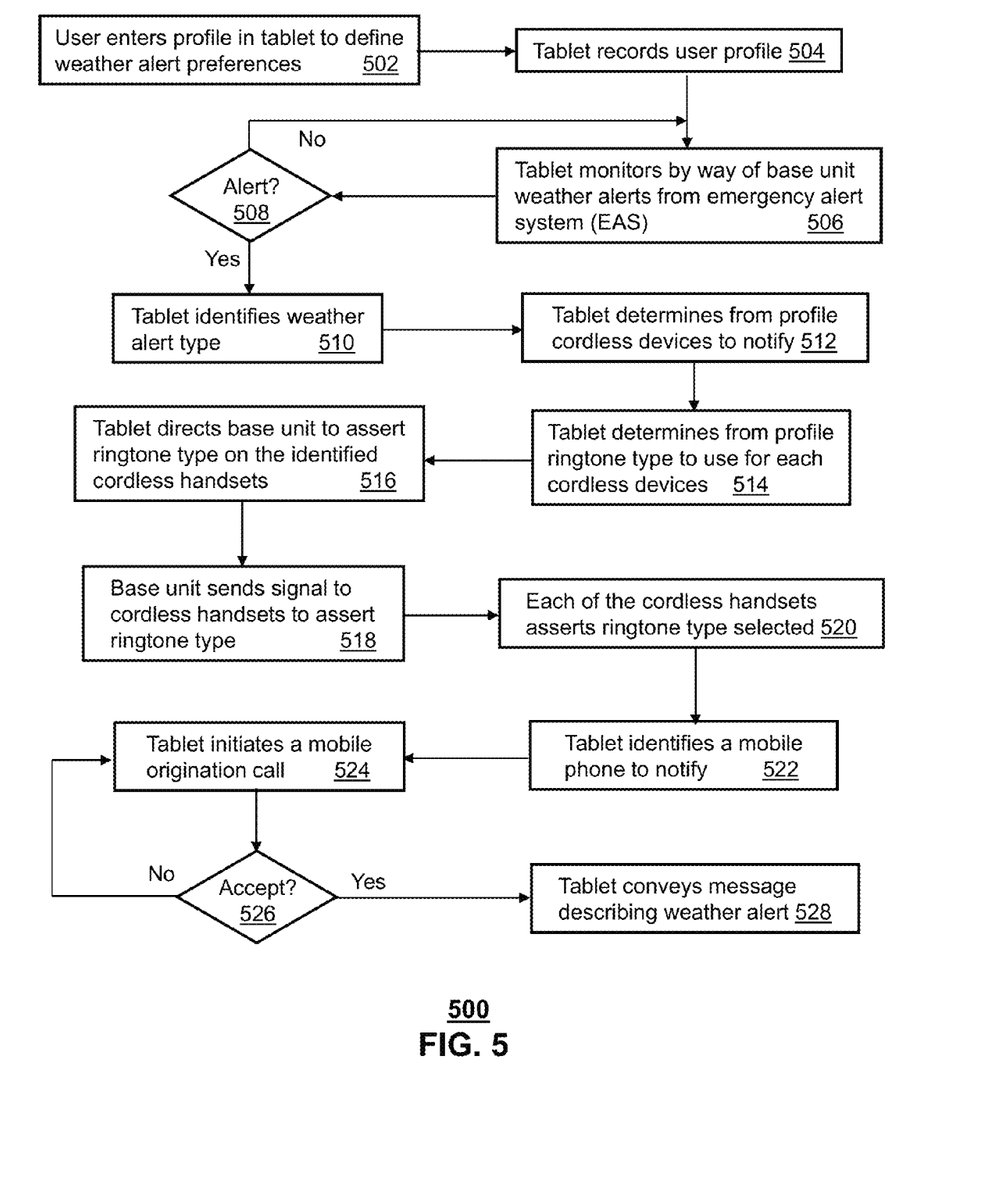
FIG. 5 depicts an illustrative embodiment of a method according to the present disclosure.
Figure 6:
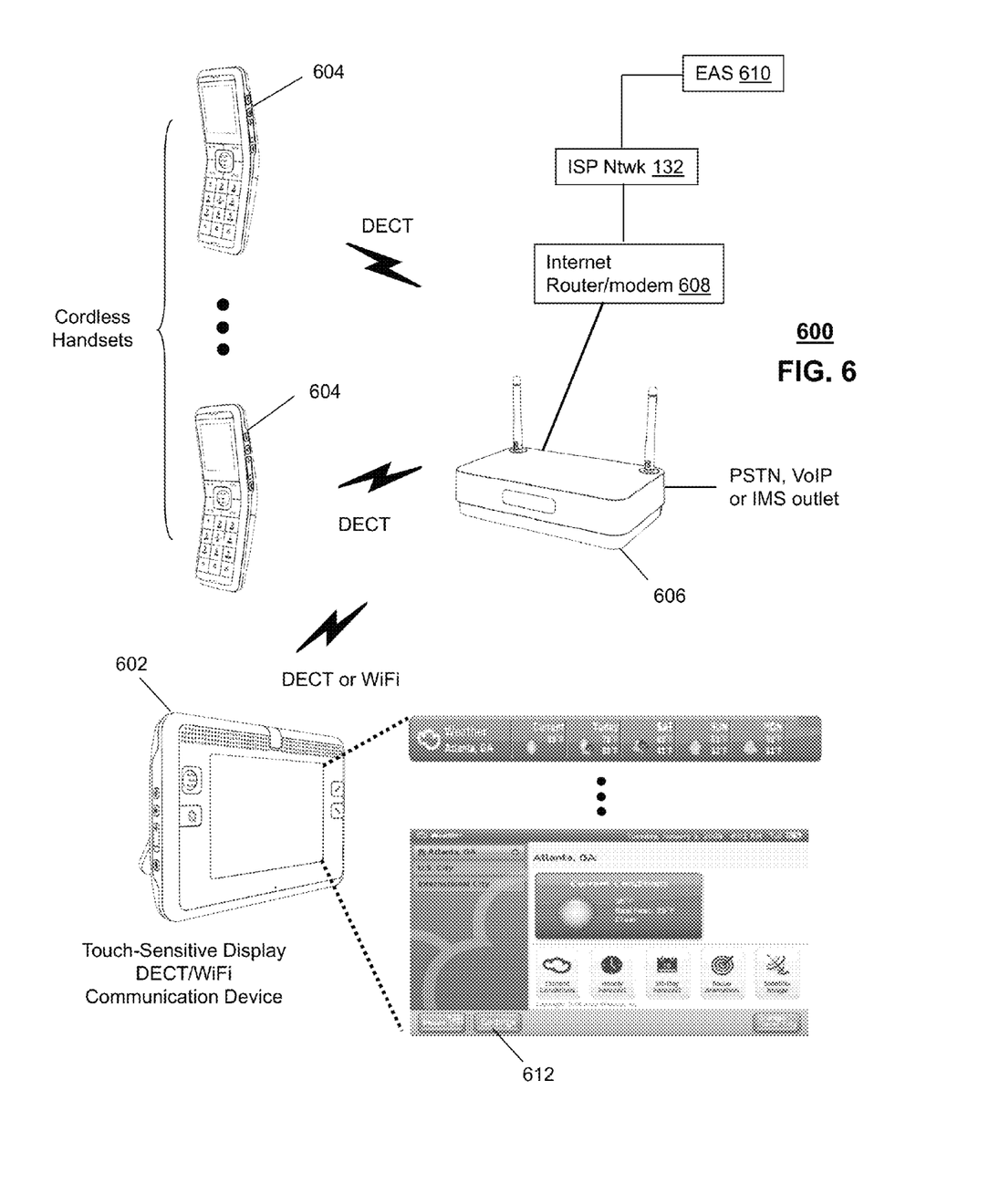
FIG. 6 depicts an illustrative embodiment of a block diagram of communication devices operating according to the method of FIG. 5.

FIG. 5 depicts an illustrative method 500 for distributing alerts. FIG. 6 depicts an illustrative embodiment of a block diagram 600 of communication devices operating according to method 500. Block diagram 600 comprises a communication device 602 in the form of a tablet with a touch-sensitive display (herein referred to as tablet 602). The tablet 602 can include communication technology to support both DECT and WiFi protocols. The tablet 602 can be communicatively coupled to a base unit 606 by way of the DECT and WiFi air interfaces. A plurality of cordless handsets 604 can also be communicatively coupled to the base unit 606 using the DECT protocol.

The base unit 606 can include communication technology for communicatively interfacing to a PSTN, VoIP or IMS network such as those described earlier. The base unit 606 can also include communication technology for communicatively interfacing to the ISP network 132 of FIG. 1 by way of a common Internet/router modem 608. The base unit 606 can provide the cordless handsets voice communication services, and the tablet 602 a combination of voice and data communication services.

The tablet 602 can access an emergency alert system (EAS) 610 by way of the data services of the base unit 606. The EAS 610 can represent a weather alert distribution system managed by local or federal governments, or by privately funded organizations. The EAS 610 can receive weather alerts from common centers that monitor weather on 24 hour cycles, 365 days a year.

With the configuration of FIG. 6 in mind, method 500 can begin with step 502 in which a user of the tablet 602 enters a profile to define weather alert preferences. In this step, the tablet 602 can present the user a user interface by way of the touch-sensitive display. The user interface can present toolbars, each having a different purposes. One of the toolbars can present for example a weather toolbar with monitored weather conditions such as shown in FIG. 6. Other screens can present more detailed information with an option to establish settings such as by depressing button 612. The settings option can provide the user the ability to selectively identify weather alerts of interest such as for example tornadoes, slow rising floods and flash flood warnings. In addition to identifying weather alerts of interest, the user can identify which communication devices should receive a proactive alert depending on the weather alert type detected by the tablet 602.

The user interface of the tablet 602 can present checkboxes (not shown) which the user can select by way of a stencil pointer (something that looks like a pen or pencil made for touch-sensitive displays) which can be used to make selections on the touch-sensitive display. The checkboxes can present a number of scenarios of weather alert types and ringtone types to be played on particular communication devices of FIG. 6. The scenarios presented can be hierarchical, and can be temporally dependent. For example, the user can define intervals of interest: work interval, interval between end of work period and going to bed, sleep interval, and wake interval. These intervals can be uniform Monday through Friday, and varied on weekends.

For example, suppose that the user has cordless handsets 604 in the family room, master bedroom, and the kid's rooms. Further assume that the user has the tablet 602 situated in the kitchen. The user can select different scenarios for asserting alerts on the cordless handsets 604. For instance, the user may decide that an alert at the tablet 602, and the cordless handsets 604 of the master bedroom, and kid's rooms is sufficient, but not the family room which is near the tablet in the kitchen area. Additionally, the user can decide the type of ringtone to assert according to the type of weather alert detected. If for example the weather alert is a tornado or a flash flood warning, the user can program a scenario in the tablet 602 in which the ringtone type should be a siren, and that the tablet and handsets 604 of all bedrooms should emanate the siren.

If the weather alert is a slow rising flood warning, the user can program a different scenario in which only the tablet 602 and the handset 604 in the master bedroom should be prompted with a different ringtone such as a "beeping" alert. Each of the devices emanating the alert can also present by way of their displays a description of the weather alert (e.g., "Tornado sighted at XXXX. Move to the basement quickly"). Alternatively, or in combination, the devices presenting the alert can periodically cease the audible alert and replace it with a voice message emanating from a speaker phone function of the unit. The voice message can be a synthesized speech translation of the weather alert, or a canned voice message created by the user to instruct the listeners on mitigation steps. The canned messages can be tailored so that the recipient of the phone can be communicated to specifically (e.g., "Sam get out of bed, and go straight to the basement. Move quickly please."). The settings can also be varied according to a time of day. If the warning occurs in the evening or early morning, the user can program another scenario with a different combination of ringtones and selected handsets.

Once the profile has been entered in step 502, the tablet 602 can record the profile, and proceed to step 506 where it begins to monitor weather alerts from the EAS 610 by way of the base unit 606 over the WiFi air interface. The tablet 602 can continue to monitor alerts in steps 506-506 until a weather alert is detected that matches one of the weather alerts of interest entered in the user profile. When a match is detected, table 602 can proceed to step 510 where it identifies the alert type (tornado, flood, etc.) and determines from the settings in the profile the communication devices to be notified in step 512. In step 514, the tablet also determines for the identified cordless devices which ringtone type to use.

Suppose that in these steps it is determined that the tablet 602 and the cordless handsets in all bedrooms are to emanate a siren sound to warn of a pending tornado in the area. In step 516, the tablet 602 can direct the base unit 606 by way of the DECT (or WiFi) air interface to assert a siren on the identified cordless handsets. Since the tablet 602 is managing the interaction, the base unit 606 can focus its attention on the identified cordless handsets 604. In step 518, the base unit 606 can send a signal to the identified cordless handsets 604 to assert the "siren" ringtone. The siren ringtone can be a preprogrammed ringtone which the cordless handsets can retrieve from memory and assert in step 520 as directed. The tablet 602 can independently initiate the same alert. The signal transmitted to the handsets 604 can also include a description of the weather alert, which can be presented on the display of the handsets. The tablet 602 can also present the weather alert on its display. The weather alert can be described by the National Oceanic and Atmospheric Administration (NOAA) or another suitable weather alert center.

In step 502, the user can also identify in the profile one or more communication devices other than those shown in FIG. 6 which are to be notified about certain weather alerts. Assume for example that the user has directed the tablet 602 to call a mobile phone when tornadoes or flash flood warnings are detected by the tablet. In step 522, the tablet 602 can identify the mobile phone in the profile, it's calling number, and initiate in step 524 a mobile origination call to the mobile phone without assistance of the user. If the mobile phone fails to accept the call such as when the recipient of the call does not answer, the tablet 602 can terminate the call and start over at another time (e.g., after 5 minutes have elapsed). If the call is accepted, the tablet 602 can convey a pre-recorded message of the user to the recipient of the call, or a synthesized speech message to notify the recipient of the detected weather alert. The message can also be conveyed as a text and graphical message generated by the NOAA (or other organization) which can be presented on the display of the mobile phone.

Upon reviewing the aforementioned embodiments, it would be evident to an artisan with ordinary skill in the art that said embodiments can be modified, reduced, or enhanced without departing from the scope and spirit of the claims described below. Method 500 can be adapted so that the tablet or cordless phones can be an integral part of the STB 106 of FIG. 1 For example, functions of the tablet 602 in whole or in part can be transferred to the STB 106 and presented by way of a TV set 108 coupled thereto. The user profile can thus include asserting alerts by way of the STB 106 and presenting weather alert descriptions by way of the TV 108.

Other suitable modifications can be applied to the present disclosure without departing from the scope of the claims below. Accordingly, the reader is directed to the claims section for a fuller understanding of the breadth and scope of the present disclosure.

Figure 7:
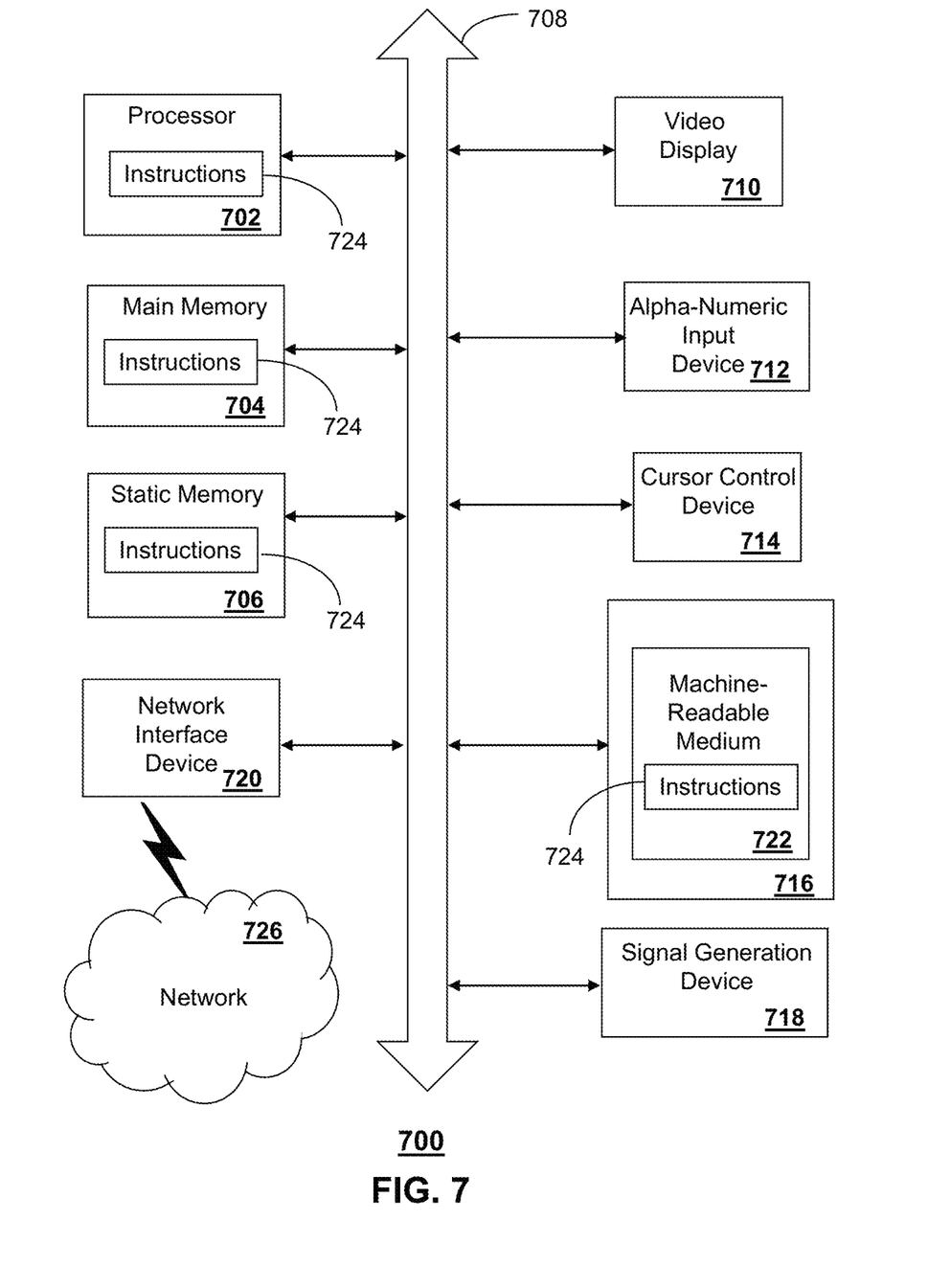
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both)), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a communication device communicatively coupled to a base unit by way of a cordless phone protocol and a wireless data protocol, wherein the base unit is communicatively coupled to a plurality of handsets by way of the cordless phone protocol and to a voice communication system and a data communication system to provide voice and data communication services to the communication device and to the plurality of handsets;
   a memory to store computer instructions; and
   a processor in communication with the memory, wherein the processor, responsive to executing the computer instructions performs operations comprising:
      monitoring a source for weather alerts;
      detecting a weather alert;
      determining from the weather alert a weather alert type;
      retrieving a user profile;
      identifying from the user profile and the weather alert type a group of the plurality of handsets as identified handsets to be notified of the weather alert;
      identifying from the user profile a ringtone type for each of the identified handsets; and
      causing, by way of the base unit, each of the identified handsets to assert a ringtone according to the ringtone type identified therefor.

2. The system of claim 1, wherein the ringtone identifies the weather alert type.

3. The system of claim 1, wherein the voice communication system comprises one of a circuit-switched communication system, a packet-switched communication system, or a hybrid communication system comprising a combination of the circuit-switched and packet-switched communication systems.

4. The system of claim 3, wherein the hybrid communication system is one of an Internet protocol multimedia subsystem network, an Internet protocol television communication system, or a combination thereof.

5. The system of claim 1, wherein the source of the weather alerts is communicatively coupled to the data communication system.

6. The system of claim 1, wherein the operations further comprise:
   sending to the base unit a message identifying the handsets to be notified of the weather alert and the ringtone type to be used for each of the handsets, to cause the base unit to transmit a signal to each of the identified handsets according to a digital enhanced cordless telecommunications protocol to assert the ringtone type identified in the message.

7. The system of claim 1, wherein the operations further comprise:
   identifying from the user profile a mobile phone;
   initiating a mobile origination call directed to the mobile phone by way of the base unit;
   detecting an acceptance of the mobile origination call by the mobile phone; and
   presenting a message associated with the weather alert.

8. A method, comprising:
- monitoring, by a communication device comprising a processor, a source for weather alerts;
- detecting, by the communication device, a weather alert;
- determining, by the communication device, from the weather alert a weather alert type;
- retrieving, by the communication device, a user profile;
- identifying, by the communication device, from the user profile and the weather alert type a group of cordless phone handsets of a plurality of cordless phone handsets as identified cordless phone handsets to be notified of the weather alert;
- selecting, by the communication device, from the user profile a ringtone type for each of the identified cordless phone handsets, wherein the ringtone type identifies the weather alert type; and
- transmitting, by the communication device, a message to cause each of the identified cordless phone handsets to assert the ringtone type identified therefor.

9. The method of claim 8, wherein the communication device and the cordless phone handsets are communicatively coupled to a base unit by way of a digital enhanced cordless telecommunications protocol.

10. The method of claim 8, wherein the communication device is further communicatively coupled to a base unit according to a wireless fidelity protocol, wherein the base unit is communicatively coupled to a voice communication system and to a data communication system, wherein the base unit provides voice communication services to the plurality of cordless handsets, and wherein the base unit provides voice and data communication services to the communication device.

11. The method of claim 10, wherein the voice communication system comprises one of a circuit-switched communication system, a packet-switched communication system, or a hybrid communication system comprising a combination of the circuit-switched and packet-switched communication systems, and wherein the hybrid communication system comprises an Internet protocol multimedia subsystem network.

12. The method of claim 10, wherein the source of the weather alerts is communicatively coupled to the data communication system, and wherein the ringtone type comprises one of a siren and a speech message.

13. The method of claim 8, further comprising:
- sending, by the communication device, a message according to a digital enhanced cordless telecommunications protocol, wherein the message identifies the cordless phone handsets to be notified of the weather alert and the ringtone type to be used for each of the handsets; and
- causing, by the communication device, a base unit to transmit a signal to each of the identified cordless phone handsets according to the digital enhanced cordless telecommunications protocol to assert the ringtone type identified in the message.

14. The method of claim 8, further comprising:
- identifying, by the communication device, from the user profile a mobile phone;
- initiating, by the communication device, a mobile origination call directed to the mobile phone by way of a base unit;
- detecting, by the communication device, an acceptance of the mobile origination call by the mobile phone; and
- presenting, by the communication device, a message associated with the weather alert.

15. A method, comprising:
- detecting, by a communication device comprising a processor, a weather alert;
- determining, by the communication device and from the weather alert, a weather alert type;
- identifying, by the communication device, from a user profile and the weather alert type, a group of companion cordless phone handsets of a plurality of cordless phone handsets as identified cordless phone handsets to be notified of the weather alert;
- determining, by the communication device and from the user profile, a ringtone type for each of the identified cordless phone handsets; and
- transmitting, by the communication device, a message to cause each of the identified cordless phone handsets to assert the ringtone type identified therefor, wherein the communication device comprises a tablet with a touch-sensitive display, and wherein the tablet and the cordless phone handsets are communicatively coupled to a base unit according to a digital enhanced cordless telecommunications protocol.

16. The method of claim 15, wherein the ringtone type determined for each of the cordless phone handsets identifies the weather alert type.

17. The method of claim 15, further comprising communicatively coupling, by the communication device, to the base unit according to a wireless fidelity protocol, wherein the base unit is communicatively coupled to a voice communication system and a data communication system, wherein the base unit provides voice communication services to the plurality of cordless phone handsets, and wherein the base unit provides voice and data communication services to the communication device.

18. The method of claim 17, wherein the voice communication system comprises one of a circuit-switched communication system, a packet-switched communication system, or a hybrid communication system comprising a combination of the circuit-switched and packet-switched communication systems, and wherein the hybrid communication system comprises an Internet protocol multimedia subsystem network.

19. The method of claim 15, further comprising:
- identifying, by the communication device, from the user profile a mobile phone;
- initiating, by the communication device, a mobile origination call directed to the mobile phone by way of the base unit;
- detecting, by the communication device, an acceptance of the mobile origination call by the mobile phone; and
- presenting, by the communication device, a message associated with the weather alert.

20. The method of claim 15, wherein the weather alert comprises an emergency alert system weather alert.

* * * * *